Dec. 20, 1966 F. F. WHITEHEAD 3,292,763

VERTICAL MEASURING SCALE FOR HIGH SPEED PRINTERS

Filed April 12, 1965

INVENTOR.
FRANCIS F. WHITEHEAD
BY
John T. O'Halloran
Attorney

United States Patent Office 3,292,763
Patented Dec. 20, 1966

3,292,763
VERTICAL MEASURING SCALE FOR HIGH SPEED PRINTERS

Francis F. Whitehead, Cherry Hill, N.J., assignor to Radio Corporation of America, a corporation of Delaware Filed Apr. 12, 1965, Ser. No. 447,243
2 Claims. (Cl. 197—187)

Figure 1:
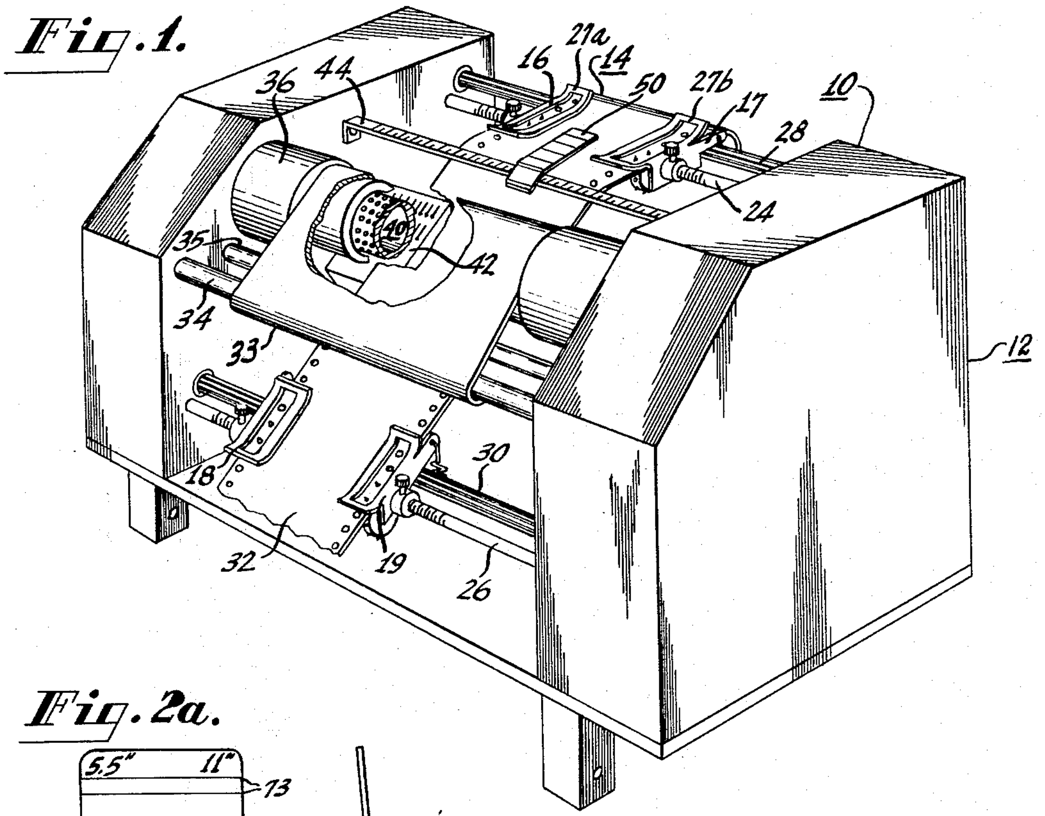

This invention relates to high speed printers, and more particularly relates to vertical measuring devices for positioning rolls of documents to be printed.

High speed printers are frequently operated with a computer to print data on documents under the command of the computer. The documents may, for example, comprise a roll of preprinted forms such as bonds. The name of the bond holder or other data may be printed in a blank space provided on each document for that purpose. Each separate roll of documents is inserted into the printer and the first document on the roll to be printed must be manually positioned to the correct place. Once the first document to be printed is correctly positioned, each successive document in the series is printed correctly because the printer may be programmed to skip the required number of spaces to reach the blank space in each successive document in the series. A problem arises in the vertical positioning of the first document printed because in many printers the actual printing of this document is not visible to the operator of the machine. This is because the inked ribbon or other apparatus entirely blocks the document in some printers. Therefore, the operator does not know the exact position of the line actually printed on the document until the document moves to the top of the machine. In some printers a few documents are printed before the first imprinted document becomes visible to the operator. If the print line is incorrect, the spare copies normally provided at the beginning of each roll of documents may be entirely used up and the roll has to be manually adjusted to begin all over again. Repeated adjustments may have to be made by an unskilled operator. Such adjustments are not only tedious and time consuming but are also extremely costly due to the fact that the printer is not operated during this time.

Accordingly, it is an object of this invention to provide a new and improved document positioner for a high speed printer.

It is another object of this invention to provide an inexpensive measuring scale for accurately positioning documents in a high speed printer.

In accordance with the invention, a measuring scale is provided to vertically position documents in a high speed printer. The scale has a plurality of measuring indicia thereon and is mounted at a fixed distance from the print line of the printer. The distance from the print line to each different one of said indicia is a multiple of the vertical size of documents in each different group of documents of various sizes. By positioning one document in each roll of documents in accordance with the measuring scale, the remaining documents in the roll are accurately positioned to have the imprintation fall in the correct vertical position.

Figure 2A:
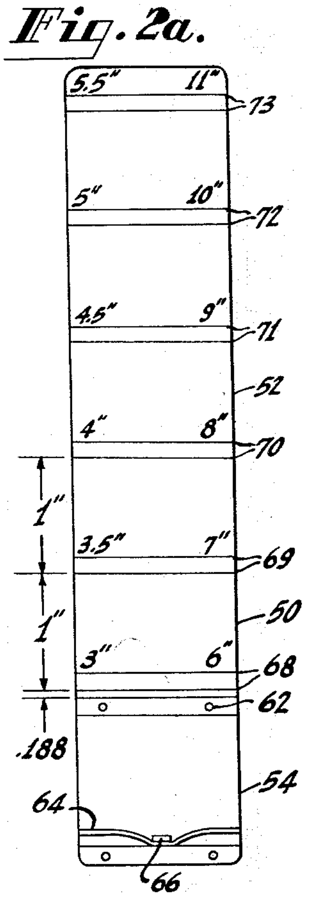
Figure 2B:

In the drawings:

FIGURE 1 is a perspective view, partially broken and in outline form, of a high speed pirnter utilizing the invention; and, FIGURES 2*a* and 2*b* are plan and side views respectively, of the measuring scale used in the printer of FIGURE 1.

Referring now to FIGURE 1, a high speed printer 10, utilizing the invention, includes a frame 12 on which paper positioning and advancing means 14 including a plurality of tractors 16, 17, 18 and 19 are mounted. The upper tractors 16 and 17 are mounted on a support bar 24 whereas the lower tractors 18 and 19 are mounted on the support bar 26. The support bars 24 and 26 are fastened rigidly to the frame 12 and permit the horizontal positioning of the tractors 16–19 to support documents or paper of various sizes. The tractors 16 and 17 also include sprocket drives **27*a* and 27*b*, the activation of which is controlled by a sprocket drive shaft 28. Similar sprockets are included in the tractors 18 and 19 and a sprocket drive bar 30 drives these sprockets. The paper to be printed includes a plurality of documents that are serially connected in web 32 shown broken in FIGURE 1. Each document has perforated end edges to permit separating them after printing. The document web 32 includes a plurality of holes on the side edges thereof for the insertion therethrough of the sprockets in the tractors 16–19. The sprocket drivers 28 and 30 advance the document web 32 under control of the computer. After insertion into the lower tractors 18 and 19, the document web 32 is threaded beneath an inked ribbon 33. The ribbon 33 is connected at either end thereof to ribbon feed rolls 34 and 35 which are mounted at each end thereof into the frame 12. The ribbon roll 34 rotates so as to move the ribbon 33 downwardly and whereas the roll 35 moves the ribbon 33 upwardly. A ribbon guide 36 that is mounted in the frame 12 supports the ribbon 33. The guide 36 partially surrounds a print roll 40. The print roll 40 includes a plurality of characters that are formed in annular rings, one ring for each column on the papers printed. The document web 32 is mounted so as to be positioned between the inked ribbon 33 and a print hammer module 42. The print hammer module 42 includes one hammer for each annular print ring or column. When actuated, the hammers cause the document on the web 32 and the inked ribbon 33 to impinge against the character type bars on the print roll 40 to transfer the impressions of the bars onto the document web 32. The print hammers in the module 42 are actuated to print one print line at a time. The print line therefore occurs in the same space each time but the motion of the document web 32 prevents one print line from overlapping the next print line. A column scale 44 is fixedly mounted on the frame 12 to permit the exact horizontal position of the documents to be ascertained. The column scale 44** due to its mounting defines a fixed reference position from the print line.

As shown in FIGURE 1, the document being printed by the printer 10 is hidden from the operator of the machine by the inked ribbon 33 and the other equipment on the printer 10. Consequently, the line of print printed on documents is not seen by the operator until the document web 32 advances above the inked ribbon 33. An unskilled operator has difficulty in vertically positioning documents to be printed by such a machine. In accordance with the invention, a vertical measuring scale 50 is mounted on the column scale 44 to permit the documents to be correctly positioned.

Referring to FIGURES 2*a* and 2*b*, the vertical measuring scale 50 includes a transparent plastic frame member 52 which is attached to a base member 54 for fastening to the column scale 44. The base 54 includes an aluminum backplate 56 that is spaced from the plastic frame member 52 by means of a pair of supports 58 and 60. The supports 58 and 60 space the backplate 56 such that the column scale 44 may be inserted through the base member 54 and the scale 50 supported thereby.

The transparent member 52 is connected to the backplate 56 by means of a plurality of screws 62 inserted through the supports 58 and 60. The base member 54 also includes a leaf spring 64 that is mounted on the lower support member 60 by means of a screw 66. The spring 64 holds the scale 50 upright on the column scale 44 and also permits the measuring scale 50 to be moved laterally on the column scale 44. The face of the plastic member 52 of the scale 50 has inscribed thereon a plurality of pairs of lines 68 through 73. Each pair of the lines locates the vertical position of a print line for each differently sized document that can be printed in the printer 10. For example, the pair of lines 68 locate the print line on documents three inches in height. The pair of lines 69 locate the print line for documents three and one-half inches in height, etc. Each size document is inscribed above and to the left of the pairs of lines 68–73. It is also to be noted that double size documents are inscribed above and to the right of the corresponding lines. The pairs of lines are inscribed on the plastic member 56 of the scale 50 at a location thereon such that the bottom of these lines is a fixed distance from the print line printed by the print roll 40. The distance is a multiple of the height of each document size to be printed. The multiple selected depends upon the number of documents that occur between the print line printed by the print roll 40 and the column scale 44. The printer 10 of FIGURE 1 may be an Anelex type 4–1000 and in such case the distance between the print line and each pair of lines 68–73 is a multiple of two of the size of the documents.

For this type of printer 10, the distance from the top of the column scale 44 to the bottom line of the pair 68 is .188 inch. Each line in the pairs of lines 68–73 is separated from its mate by the height of a character in the font used in the print roll 40. The bottom line of each pair of lines 68–73 is spaced one inch from the bottom line of the next successive pair of lines. This is because there is a multiple of two documents separating the print line from the column scale 44. If there were, for example, four documents in this space, the lines 68–73 would be spaced two inches from each other, etc.

The upper portion of the vertical scale 50 is inclined at an angle $\theta$ from the base member 54 so as to permit the upper portion to lie flat along the document web 32 as shown in FIGURE 1. This angle $\theta$ for the Anelex printer type 4–1000 is 15°.

In operation, an operator of the high speed printer 10 inserts a new document web 32 into the machine by opening the tractors 16–19 and inserting the row of holes in the documents onto the sprockets in the tractors. The document web 32 is then positioned depending on the vertical size of the documents being printed and the location on the document of the blank space that is to be imprinted. If a three inch document is being printed, the topmost document is advanced until the blank space thereon lies between the pair of lines 68 on the vertical measuring scale 50. This vertical positioning insures that the document actually being printed is in the correct vertical position. The adjustment is simple and fast and needs to be done only one time for each document web 32 inserted in the printer.

Thus, in accordance with the invention, a new and improved vertical positioner for a high speed printer is provided. The positioner includes a vertical measuring scale which permits documents of varying sizes to be accurately positioned in the machine. This decreases the time in which the printer is not operating and hence reduces the overall cost of printing.

What is claimed is:

1. In a high speed printer for printing on documents, one at a time, in a web of documents of any one of a variety of predetermined sizes, the combination comprising, means for printing a print line of a plurality of characters at a time on said documents, said print line being printed on a document in said web that is hidden from the view of an operator of said printer, a measuring scale for locating on a document visible to said operator a line that is spaced from said print line a vertical distance that is a multiple of the vertical size of said documents in said web so that the position of said print line on said hidden document is ascertained, said measuring scale having a base member portion and a frame member portion, means for mounting said base member portion on said printer at a fixed vertical distance, greater than zero, from said print line, said frame member portion of said measuring scale having a plurality of measuring indicia formed thereon at different prescribed vertical distances from said base member portion so that the sum of said fixed vertical distance and each of said prescribed vertical distances is a multiple greater than one of the vertical size of documents in said variety of sizes, and means for adjusting the positioning of said web of documents with respect to said measuring scale to determine the location of the print line to be printed on said documents.

2. The combination in accordance with claim 1 wherein said frame member portion of said measuring scale is transparent.

References Cited by the Examiner

UNITED STATES PATENTS

| | | | |
|---|---|---|---|
| 547,002 | 10/1895 | Elliott et al. | 197—139 |
| 569,909 | 10/1896 | Atwood | 197—189 |
| 921,726 | 5/1909 | McNamara | 197—189 |
| 1,007,233 | 10/1911 | Paquet | 197—141 |
| 1,013,953 | 1/1912 | Richardson | 197—189 |
| 1,091,122 | 3/1914 | Crowther et al. | 197—189 |
| 2,156,315 | 5/1939 | Sherman et al. | 197—143 X |
| 2,425,112 | 8/1947 | Meacham | 197—189 |
| 2,781,966 | 2/1957 | Silverberg | 197—189 X |
| 3,035,680 | 5/1962 | Fondiller | 197—190 |
| 3,049,211 | 8/1962 | Demmel et al. | 197—143 X |
| 3,129,802 | 4/1964 | Engle | 197—139 |
| 3,154,235 | 10/1964 | Hubbard | 197—133 X |

ROBERT E. PULFREY, *Primary Examiner.*

E. WRIGHT, *Assistant Examiner.*